United States Patent Office 3,150,489
Patented Sept. 29, 1964

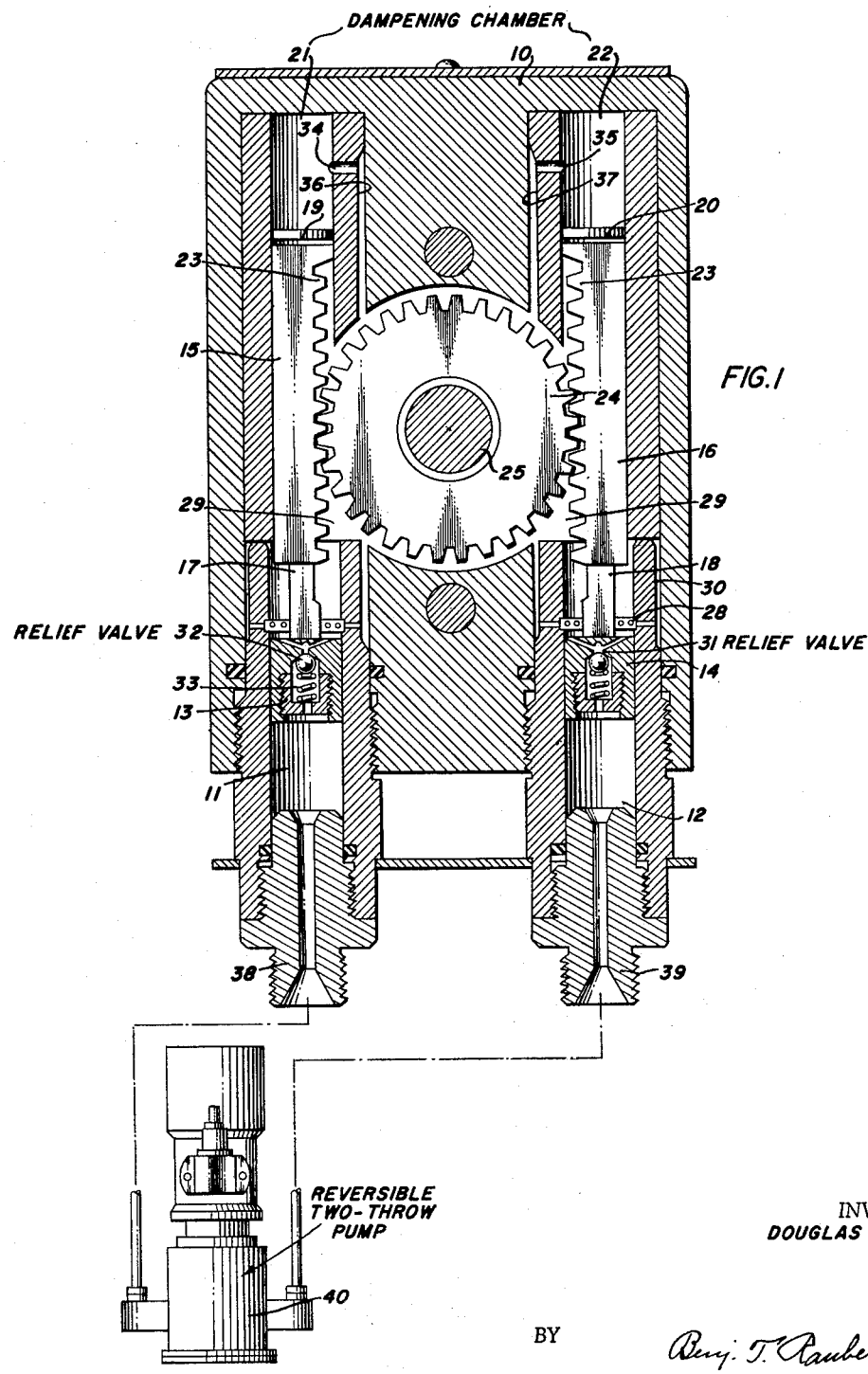

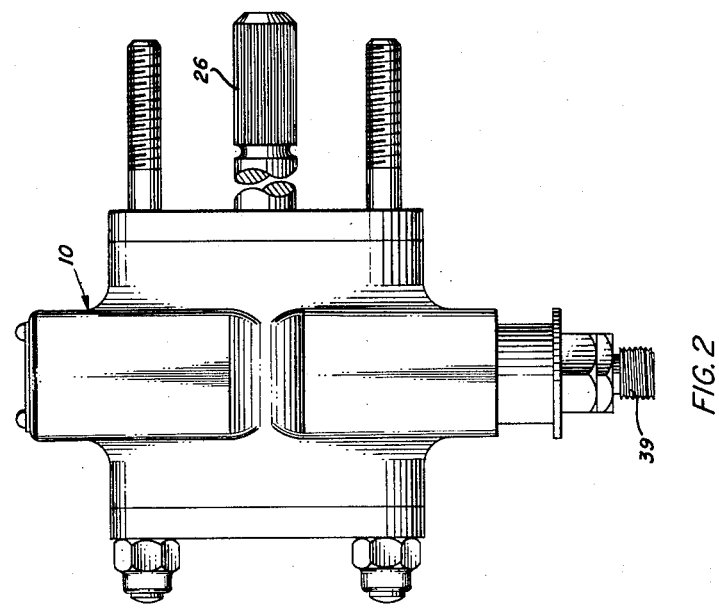
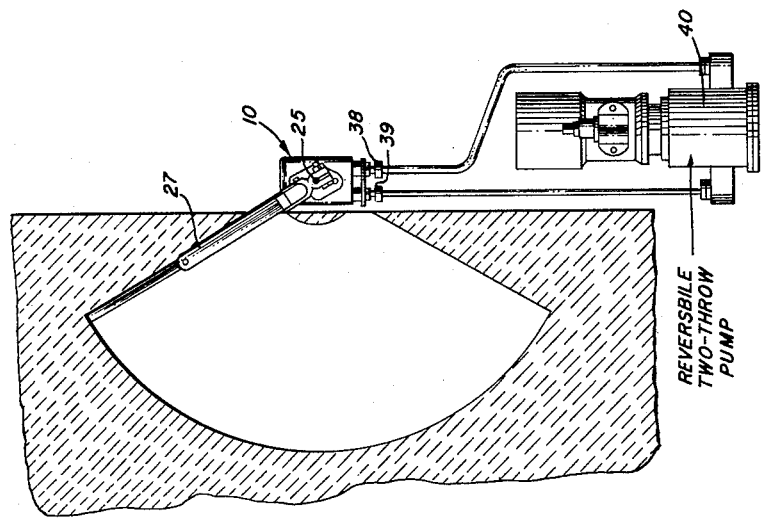

3,150,489
HYDRAULICALLY OPERATED WINDSCREEN
WIPERS
Douglas Dewar, Wolston, near Coventry, England, assignor to Dunlop Rubber Company Limited, a British company
Filed Oct. 11, 1961, Ser. No. 144,502
Claims priority, application Great Britain, Oct. 14, 1960, 35,197/60
3 Claims. (Cl. 60—52)

This invention relates to hydraulically-operated windscreen wipers.

Windscreen wipers of this kind usually comprise a wiper blade mounted on a shaft which is caused to oscillate by means of a rack movable by a piston slidable in a cylinder. The piston is movable in one direction at least by hydraulic means, usually a pump. Generally a two-throw pump is used to actuate two pistons each movable in a cylinder and the pistons are inter-connected so that outward movement of one piston will return the other piston.

It has been found, with windscreen wipers of this kind, that a certain amount of damage is caused by the continued and unrestricted "bottoming" of the pistons in their cylinders.

The object of the present invention is to provide a windscreen wiper unit and system wherein this difficulty is overcome.

According to the present invention an hydraulic windscreen wiper unit comprises a housing, a pinion mounted therein on a shaft adapted to carry a wiper blade, a rack engaging with said pinion and a piston reciprocable in a cylinder to actuate said rack, pinion and shaft, and means associated with the rack to provide for effective damping of the said rack towards the end of its stroke in one direction.

The invention may comprise mounting a rack to engage with a pinion said rack having at each end a piston fluid-tightly movable in a cylinder, said cylinders comprising alternately pressure chambers, to move the rack with a reciprocating motion, and dampening chambers, to dampen the movement of the rack towards the end of its stroke, said dampening being effected by a bleed orifice in the dampening chamber. However, in the preferred embodiment said means comprises a plunger at the end of the rack remote from said piston, said plunger being fluid-tightly slidable within a pressurised dampening chamber to effectively dampen the movement of the rack at the end of its stroke in one direction.

Also, according to the present invention an hydraulic windscreen wiper unit comprising a housing, a pinion mounted therein on a shaft adapted to carry a wiper blade, two racks diametrically situated with respect to and engaging with said pinion, two cylinders each having a single acting piston slidable therein, each piston being associated with one of the racks and each rack having a plunger formed at the end remote from said piston, said plunger being fluid-tightly slidable in a dampening chamber to effectively dampen the movement of the rack at the end of its working stroke.

Preferably said dampening is carried out by hydraulic fluid under pressure contained within said dampening chamber and being allowed to escape during the working stroke of the rack into a space surrounding the pinion through bleed passages provided in each dampening chamber.

The invention will now be described with reference to the accompanying drawings of which:

FIGURE 1 is a sectional front elevation of the wiper unit,

FIGURE 2 is a side elevation of the wiper unit,

FIGURE 3 is a diagrammatical view of the wiper unit and hydraulic pump.

The wiper unit comprises a housing 10 in which two parallel vertical cylinders 11, 12 are disposed side by side and a pair of single acting pistons 13, 14 are slidable in each of the cylinders 11, 12. Associated with each piston 13, 14 are racks 15, 16, the lower ends of which are provided with projections 17, 18 of lesser diameter which are adapted to abut the tops of the pistons 13, 14. The upper ends of the rack 15, 16 form plungers 19, 20 slidable in dampening chambers 21, 22 which are cylindrical and co-axial with the cylinders 11, 12. The portion intermediate the ends of each rack 15, 16 is provided with teeth 23 to engage the toothed periphery of a pinion 24 which is rotatably mounted in the housing 10 on a shaft 25, an extension 26 of which is adapted to mount the wiper blades 27.

The cylinders 11, 12 are provided with outlets in the form of radially formed holes 28 which communicate with the space surrounding the pinion 24, to be known as the body chamber 29, by means of an annular space 30 surrounding the outer wall of the cylinders 11, 12. The pistons 13, 14 are provided with a central hole 31, formed axially therein, that is adapted to be closed by a ball 32 pressed by a spring 33, the assembly comprising a pressure relief valve.

The body chamber 29, and the dampening chambers 21, 22 are connected by a bleed comprising radial passages 34, 35, formed near the top of the dampening chambers 21, 22, connecting with axially formed passages 36, 37.

Unions 38, 39, carry liquid to and from the cylinders 11, 12, and connect with a two-throw pump 40 of the type described in British Patent No. 639,877.

The operation of the wiper unit is as follows:

Liquid under pressure from the pump 40 is delivered via the union 38 to the cylinder 11 and forces the piston 13, rack 15 and plunger 19 upwards on their working stroke and in doing so rotates the pinion 24 in a clockwise direction. The associated shaft 25 and wiper arm 27 makes one traverse. As the plunger 19 moves upwards liquid is displaced from the dampening chamber 21 through the bleed passages 34, 36 into the body chamber 29.

Rotation of the pinion 24 in a clockwise direction forces the rack 16, plunger 20, and piston 14 downwards. As it moves downwards the plunger 20 tends to suck liquid into the dampening chamber 22 via the bleed passages 35, 37 and is materially assisted in this by the fact that liquid in the body chamber 29 is under pressure, the pressure relief valves 32 positioned in both pistons 13, 14 remaining closed to retain this pressure. If the body chamber 29 were not pressurised the plunger 20 would not induce sufficient liquid by suction on the downward stroke into the dampening chamber 22 to provide dampening and a liquid cushion on the upward stroke and damage to the unit might occur.

The two throw pump 40 is adapted to pump a greater volume of fluid on one throw than on the other. Assuming that the greater volume to be flowing through union 38 the pressure from the pump will raise the piston 13 until at the end of its working stroke the piston uncovers the radial holes 28. Fluid will then flow into the body chamber 29 until the pressure therein is sufficient to blow off the relief valve in the piston 14 and to return the excess fluid to the opposite side of the pump 40.

When the pump 40 starts on the reverse throw the piston 14, rack 16 and plunger 20 will begin to rise and the pinion 24 will rotate in an anti-clockwise direction thus traversing the wiper blade 27 once again. The dampening chamber 22 now being full of fluid due to the body chamber 29 being pressurised, the movement of the rack 16 will be slightly dampened by the flow of liquid out of the bleed passages 35, 37 until the plunger seals the passage 35 and the liquid trapped at the top of the dampening chamber 22 cushions the end of the stroke of the rack 16.

This process is continued while the pump supplies fluid to the cylinders.

Having now described my invention, what I claim is:

1. An hydraulic windscreen wiper unit comprising a housing, a pinion mounted in the housing, a rock shaft in said housing on which said pinion is fixed and adapted to carry a wiper blade, two racks respectively engaging diametrically opposite points of said pinion, a pair of cylinders associated with said housing and each containing a piston, said pistons and racks being drivably connected one to each rack, and a pair of plungers attached one to each rack at the ends thereof remote from the pistons, said housing having a pair of dampening chambers, one for each plunger in which said plungers are slidable fluid-tightly, the housing having a single body chamber in which said pinion and racks are mounted and a bleed passage from each dampening chamber to said body chamber, one cylinder being provided with an outlet leading from the interior of the cylinder to the body chamber and positioned so that the associated piston moves beyond said outlet when it reaches the end of its stroke in the outward direction from its cylinder to allow liquid to escape from the cylinder into the body chamber, a relief valve in the other piston to allow liquid to escape from said body chamber into its associated cylinder when the pressure in said body chamber exceeds a predetermined value, and a two-throw hydraulic pump, said pump being connected to the two cylinders of the wiper unit and being arranged to supply a greater volume of liquid to the cylinder having said outlet.

2. An hydraulic windscreen wiper unit comprising a housing, a pinion in said housing, a rock shaft on which said pinion is mounted and adapted to carry a wiper blade, two racks respectively engaging diametrically opposite points of the pinion, a pair of cylinders associated with the housing and each containing a piston, said pistons and racks being drivably connected one piston to each rack, and a pair of plungers attached one to each rack at the ends thereof remote from the pistons, said housing having a pair of dampening chambers, one for each plunger in which said plungers are slidable fluid-tightly, the housing having a single body chamber in which the pinion and racks are mounted and a bleed passage from each dampening chamber to said body chamber, each cylinder being provided with an outlet leading from the interior of the cylinder to the body chamber and positioned so that the associated piston moves beyond said outlet when it reaches the end of its stroke in the outward direction from its cylinder to allow liquid to escape from the cylinder into the body chamber, a relief valve in each piston to allow liquid to escape from said body chamber into its associated cylinder when the pressure in said body chamber exceeds a predetermined value, and a two-throw hydraulic pump, said pump being connected to the two cylinders of the wiper unit and being arranged to supply a greater volume of liquid to one cylinder than to the other cylinder.

3. An hydraulic windscreen wiper unit according to claim 1 wherein said bleed passages are disposed in the sides of their respective dampening chambers in position to be sealed by their respective plungers when the associated pistons reach the ends of their respective strokes in the outward direction from said cylinders.

References Cited in the file of this patent

UNITED STATES PATENTS

| | | |
|---|---|---|
| 1,756,307 | Rowntree | Apr. 29, 1930 |
| 2,298,542 | Potter | Oct. 13, 1942 |
| 2,500,777 | Timmerman et al. | Apr. 14, 1950 |
| 2,598,480 | Wright | May 27, 1952 |
| 2,621,634 | Carey | Dec. 16, 1952 |
| 2,808,256 | Landert | Oct. 1, 1957 |
| 2,948,266 | Gratzmuller | Aug. 9, 1960 |

FOREIGN PATENTS

| | | |
|---|---|---|
| 639,877 | Great Britain | July 5, 1950 |